(12) United States Patent
Zhang et al.

(10) Patent No.: US 11,162,389 B2
(45) Date of Patent: Nov. 2, 2021

(54) SYSTEM AND METHOD FOR PROVIDING SUPERCRITICAL STEAM

(71) Applicant: SAUDI ARABIAN OIL COMPANY, Dhahran (SA)

(72) Inventors: Wei Zhang, South Windsor, CT (US); Armand Levasseur, Windsor Locks, CT (US); Tidjani Niass, Dhahran (SA); Mourad Younes, Abquiq (SA); Glen Jukkola, Glastonbury, CT (US); Bruce Wilhelm, Enfield, CT (US); Daryl Philo, Weatogue, CT (US); Timothy Maidenford, Joliett, PA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/581,933

(22) Filed: Sep. 25, 2019

(65) Prior Publication Data

US 2020/0032675 A1    Jan. 30, 2020

Related U.S. Application Data

(63) Continuation of application No. 15/340,670, filed on Nov. 1, 2016, now Pat. No. 10,465,562.

(51) Int. Cl.
*F01K 3/20* (2006.01)
*F01K 23/10* (2006.01)
(Continued)

(52) U.S. Cl.
CPC .................. *F01K 3/20* (2013.01); *F01K 3/24* (2013.01); *F01K 7/32* (2013.01); *F01K 11/02* (2013.01);
(Continued)

(58) Field of Classification Search
CPC .......... F01K 23/06; F01K 23/105; F01K 7/22; F01K 23/103
See application file for complete search history.

(56) References Cited

U.S. PATENT DOCUMENTS

| 3,135,246 A | 6/1964 | Kochey, Jr. |
| 4,166,362 A | 9/1979 | Laurent |
(Continued)

FOREIGN PATENT DOCUMENTS

| CA | 2824847 | 3/2014 |
| DE | 10 2007 014 631 | 9/2008 |

OTHER PUBLICATIONS

Chapter 2 Flue Gases and Fuel Gases by Zevenhoven and Kilpinen.

*Primary Examiner* — Shafiq Mian
(74) *Attorney, Agent, or Firm* — Osha Bergman Watanabe & Burton LLP

(57) ABSTRACT

A system for providing supercritical steam including a first boiler that generates steam via combusting a first fuel, and a second boiler fluidly connected to the first boiler via a conduit which heats the generated steam to supercritical steam temperatures via combusting a second fuel. A first temperature of the conduit may be below a critical corrosion temperature and a second temperature of the conduit is greater than or equal to the critical corrosion temperature. A combined carbon emission rate of the first boiler and the second boiler may be less than a combined carbon emission rate of generating and heating the steam to supercritical steam temperatures using boilers that only combust the first fuel. The first boiler may be fluidly connected to a heat exchanger that heats the generated steam to a supercritical steam temperature via a flue gas produced by a gas turbine.

16 Claims, 5 Drawing Sheets

(51) Int. Cl.
*F22B 1/18* (2006.01)
*F22B 33/00* (2006.01)
*F01K 3/24* (2006.01)
*F01K 7/32* (2006.01)
*F01K 11/02* (2006.01)
*F01K 19/00* (2006.01)

(52) U.S. Cl.
CPC .............. *F01K 19/00* (2013.01); *F01K 23/10* (2013.01); *F22B 1/1815* (2013.01); *F22B 33/00* (2013.01); *Y02E 20/34* (2013.01)

(56) References Cited

U.S. PATENT DOCUMENTS

| | | |
|---|---|---|
| 4,361,009 A | 11/1982 | Schluderberg |
| 4,546,603 A | 10/1985 | Arakawa et al. |
| 4,694,783 A * | 9/1987 | Cleer, Jr. .............. F23L 15/045 |
| | | 122/1 A |
| 4,716,856 A | 1/1988 | Beisswenger et al. |
| 4,858,562 A * | 8/1989 | Arakawa ............... F01K 23/106 |
| | | 122/7 R |
| 5,181,381 A | 1/1993 | Gounder |
| 6,019,070 A | 2/2000 | Duffy |
| 7,478,524 B2 | 1/2009 | Kreitmeier |
| 7,874,162 B2 | 1/2011 | Tomlinson et al. |
| 8,495,878 B1 | 7/2013 | Smithe et al. |
| 8,839,621 B2 * | 9/2014 | Ferguson .................. F01K 7/16 |
| | | 60/647 |
| 9,709,261 B2 * | 7/2017 | Inoue ...................... F01K 13/02 |
| 2004/0200222 A1 | 10/2004 | Marin et al. |
| 2006/0081199 A1 | 4/2006 | Graves et al. |
| 2006/0236696 A1 | 10/2006 | Saviharju et al. |
| 2009/0158976 A1 | 6/2009 | Patrick et al. |
| 2009/0241860 A1 | 10/2009 | Monacelli et al. |
| 2011/0120127 A1 | 5/2011 | Lippmann et al. |
| 2011/0140453 A1 | 6/2011 | Shortlidge et al. |
| 2012/0151926 A1 * | 6/2012 | Labbe ....................... F01K 7/40 |
| | | 60/670 |
| 2012/0312207 A1 * | 12/2012 | Ghani .................... F23C 9/003 |
| | | 110/347 |
| 2014/0065559 A1 | 3/2014 | Jukkola |
| 2014/0165572 A1 * | 6/2014 | Pang ....................... F02C 7/224 |
| | | 60/736 |
| 2014/0305639 A1 | 10/2014 | Johnsen et al. |
| 2015/0192036 A1 * | 7/2015 | Sharp ..................... F22G 1/165 |
| | | 60/39.182 |
| 2016/0003159 A1 * | 1/2016 | Hotta ........................ F02C 3/04 |
| | | 60/736 |
| 2016/0305289 A1 * | 10/2016 | Hwang .................. F01K 11/02 |

* cited by examiner

SYSTEM AND METHOD FOR PROVIDING SUPERCRITICAL STEAM

CROSS-REFERENCE TO RELATED APPLICATIONS

This application is a continuation of U.S. patent application Ser. No. 15/340,670 filed on Nov. 1, 2016, which is herein incorporated by reference in its entirety.

BACKGROUND

Technical Field

Embodiments of the invention relate generally to power plant technology and, more specifically, to a system and method for providing supercritical steam.

Discussion of Art

Boilers are devices that combust a fuel, such as petroleum based products and/or coals, in a combustion chamber to generate heat. Many power plants use boilers to generate steam which in turn is used to produce electricity via a steam turbine generator. The ratio of electricity produced by a power plant per a given amount of fuel is known as the plant's efficiency. The efficiency of a power plant can be increased by increasing the temperature and/or pressure of the generated steam that powers the steam turbine generator.

Accordingly, the boilers of many modern coal power plants generate steam in the supercritical steam range, e.g., steam having a temperature greater than or equal to 565° C. The boilers of many modern oil-based power plants, however, are limited in their ability to sustain generation of supercritical steam due to the tendency of contaminants produced by combusting petroleum based oils to become corrosive at or above the surface temperatures of conduits that contain supercritical steam. Typically, when such contaminants come into contact with conduits containing supercritical steam, the contaminants may slag, foul, corrode, and/or damage the conduit. Generally, the lower the grade/quality of the petroleum based oil being fired/combusted in a boiler, the more contaminants produced, and the greater the resulting corrosion to the conduits.

Many refiners are increasing the production of high-grade petroleum products which has resulted in an increase in the amount of low-grade petroleum based oil by-products, such as Oil Heavy Residue ("OHR"). The recent relative abundance of such low-grade petroleum based oils now makes them economical for use as fuels in power plants. Therefore, many modern oil-based power plants are now designed to fire low-grade petroleum based oils. As previously stated, however, the nature of the contaminants produced by combusting low-grade petroleum based oils to become corrosive at or above the surface temperatures of conduits that contain supercritical steam hinders the efficiency of modern oil-based power plants.

Moreover, combustion of low-grade petroleum based oils tends to produce high amounts of Carbon Dioxide ("$CO_2$"). Due to increased concern that $CO_2$ may be contributing to global warming, it is now desirable to reduce the $CO_2$ emissions of power plants.

What is needed, therefore, is a system and method for providing supercritical steam which inhibits the corrosion resulting from the contaminants produced by combusting petroleum based oils, and/or which emits less $CO_2$ than existing oil based power plants.

BRIEF DESCRIPTION

In an embodiment, a system for providing supercritical steam is provided. The system includes a first boiler and a second boiler. The first boiler generates steam via combusting a first fuel. The second boiler is fluidly connected to the first boiler via a conduit such that the generated steam flows from the first boiler to the second boiler which heats the generated steam to a supercritical steam temperature via combusting a second fuel that is different from the first fuel. A first temperature of the conduit is below a critical corrosion temperature at which contaminants produced by combusting the first fuel corrode the conduit and a second temperature of the conduit is greater than or equal to the critical corrosion temperature.

In another embodiment, a method for providing supercritical steam is provided. The method includes: generating steam via combusting a first fuel in a first boiler fluidly connected to a second boiler via a conduit such that the generated steam flows from the first boiler to the second boiler; and heating the generated steam to a supercritical steam temperature via combusting a second fuel that is different from the first fuel in the second boiler. In such embodiments, a first temperature of the conduit is below a critical corrosion temperature at which contaminants produced by combusting the first fuel corrode the conduit and a second temperature of the conduit is greater than or equal to the critical corrosion temperature.

In yet another embodiment, a downstream boiler for providing supercritical steam is provided. The downstream boiler includes a combustion chamber and a steam conduit. The combustion chamber is configured to generate heat by combusting a first fuel. The steam conduit is in heating-contact with the combustion chamber and has an inlet and an outlet. The inlet is configured to fluidly connect to an upstream boiler that generates steam by combusting a second fuel that is different from the first fuel. The outlet is configured to fluidly connect to a steam turbine generator. When the inlet receives steam generated by the upstream boiler, the combustion chamber heats the received steam in the conduit to a supercritical steam temperature via combusting the first fuel such that a temperature of the steam conduit is greater than or equal to a critical corrosion temperature at which contaminants produced by combusting the second fuel corrode the steam conduit.

In yet another embodiment, a system for providing supercritical steam is provided. The system includes a first boiler and a second boiler. The first boiler generates steam via combusting a first fuel. The second boiler is fluidly connected to the first boiler via a conduit such that the generated steam flows from the first boiler to the second boiler which heats the generated steam to a supercritical steam temperature via combusting a second fuel that is different from the first fuel. In such embodiments, a combined carbon emission rate of the first boiler and the second boiler is less than a combined carbon emission rate of generating and heating the steam to a supercritical steam temperature using one or more boilers that only combust the first fuel.

In yet another embodiment, a method for providing supercritical steam is provided. The method includes: generating steam via combusting a first fuel in a first boiler fluidly connected to a second boiler via a conduit such that the generated steam flows from the first boiler to the second boiler; and heating the generated steam to a supercritical steam temperature via combusting a second fuel that is different from the first fuel in the second boiler. In such embodiments, a combined carbon emission rate of the first boiler and the second boiler is less than a combined carbon emission rate of generating and heating the steam to a supercritical steam temperature using one or more boilers that only combust the first fuel.

In yet another embodiment, a downstream boiler is provided. The downstream boiler includes a combustion chamber and a steam conduit. The combustion chamber is configured to combust a first fuel. The steam conduit is in heating-contact with the combustion chamber and has an inlet and an outlet. The inlet is configured to fluidly connect to an upstream boiler that generates steam by combusting a second fuel that is different from the first fuel. The outlet is configured to fluidly connect to a steam turbine generator. In such embodiments, a combined carbon emission rate of the downstream boiler and the upstream boiler is less than a combined carbon emission rate of one or more boilers that only combust the second fuel.

In yet another embodiment, a system for providing supercritical steam is provided. The system includes a primary boiler that generates steam via combusting a first fuel; a gas turbine that produces a flue gas via combusting a second fuel that is different from the first fuel; and a heat exchanger fluidly connected to the primary boiler and to the gas turbine via a first conduit and a second conduit, respectively. The generated steam and the flue gas flow from the primary boiler and the gas turbine via the first conduit and the second conduit, respectively, to the heat exchanger which heats the generated steam via the flue gas to a supercritical steam temperature.

In yet another embodiment, a method for providing supercritical steam is provided. The method includes: generating steam via combusting a first fuel in a primary boiler fluidly connected to a heat exchanger via a first conduit such that the generated steam flows to the heat exchanger from the primary boiler via the first conduit; and heating the generated steam to a supercritical steam temperature via a flue gas produced by combusting a second fuel in a gas turbine fluidly connected to the heat exchanger via a second conduit such that the flue gas flows to the heat exchanger via the second conduit, the second fuel being different from the first fuel.

DRAWINGS

The present invention will be better understood from reading the following description of non-limiting embodiments, with reference to the attached drawings, wherein below:

DETAILED DESCRIPTION

Figure 1:
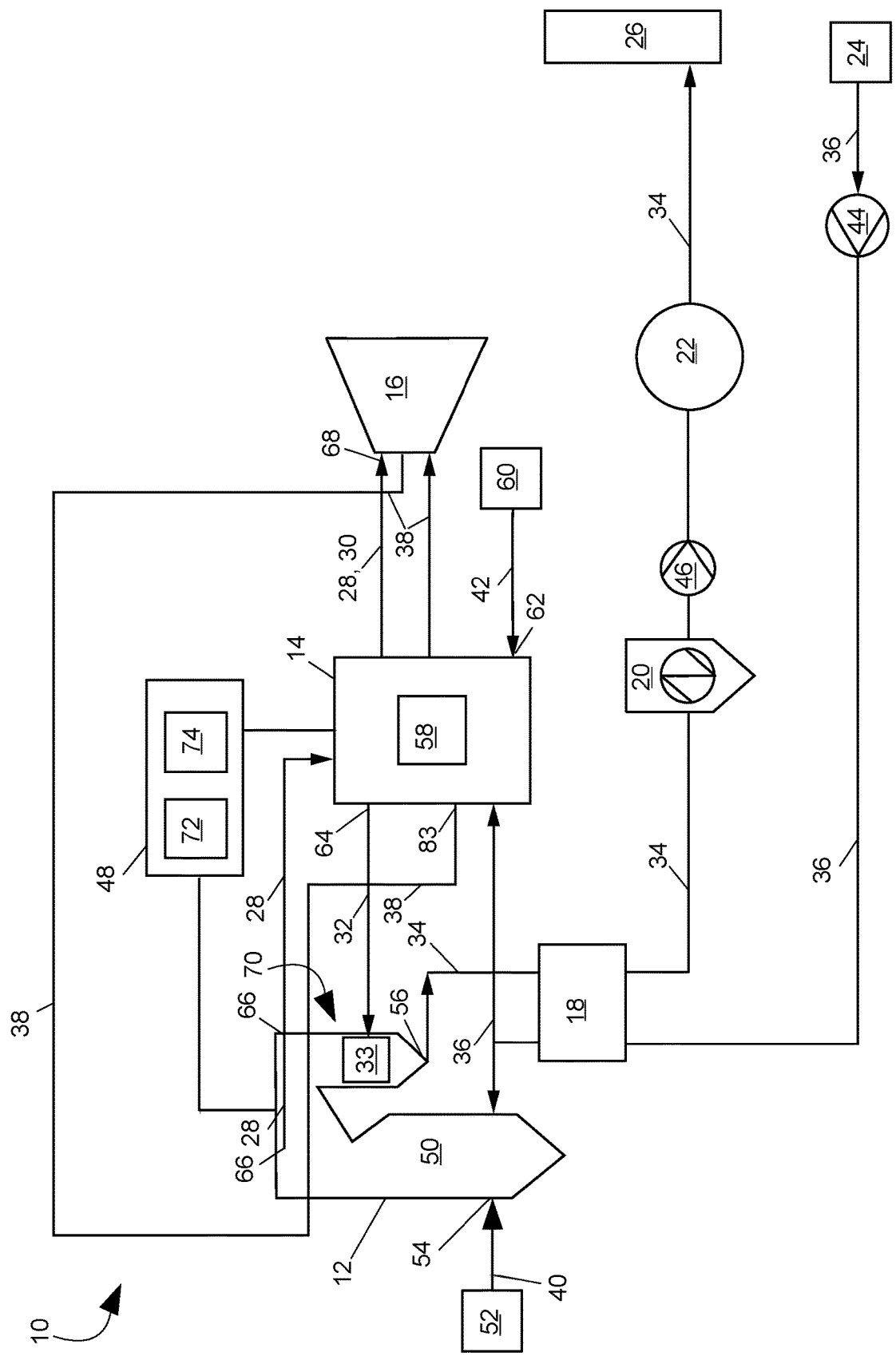
FIG. 1 is a block diagram of a system for providing supercritical steam in accordance with an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid flowing between and/or near the referenced elements. Additionally, as used herein, the term "fill" includes both fully and partially filling a containing object with a filling object. As used herein, the term "heating-contact" means that the referenced objects are in proximity of one another such that heat/thermal energy can transfer between them. As used herein, the terms "critical corrosion temperature" and "critical corrosive temperature" refer to a temperature at which contaminants produced via combusting a fuel become corrosive so as to slag, foul, corrode, and/or damage various components of a boiler beyond an acceptable level. As used herein, the terms "corrode" and "corrosive" mean capable of causing damage to a material via chemical means, e.g., oxidation and/or acid-base reactions. For example, when such a contaminant comes into contact with a surface of a conduit that is above the critical corrosive temperature of the contaminant, the contaminant may melt and stick to the surface of the conduit such that the conduit becomes degraded/damaged, e.g., the melted contaminant may foul and/or "eat away" at the conduit. As used herein, the terms "supercritical steam" and "supercritical steam temperature" refer to steam and its corresponding temperature after having been heated for a second time by a second heating source, e.g., a second boiler to a temperature higher than that to which the steam was previously heated to by a first heating source, e.g., a first boiler. As also used herein the term "combined carbon emissions" refers to the total amount of $CO_2$ generated by one or more boilers/combustion chambers. Accordingly, the term "combined carbon emission rate," as used herein, refers to the combined amount of $CO_2$ generated by one or more boilers/combustion chambers to produce a given amount of electricity and/or power.

Further, while the embodiments disclosed herein are described with respect to oil fired boilers that generate supercritical steam, it is to be understood that embodiments of the present invention are equally applicable to any device and/or process in which a conduit and/or other structural element that is exposed to contaminants produced by combusting a fuel is required to be heated to a temperature higher than a critical corrosive temperature of the contaminants, and/or processes wherein it is desirable to reduce $CO_2$ emissions.

Accordingly, referring to FIG. 1, a system 10 for providing supercritical steam is provided. The system 10 includes a first boiler 12 and a second boiler 14. The system 10 may further include a steam turbine generator 16, an air preheater ("APH") 18, an electrostatic precipitator ("ESP") and/or fabric filter ("FF") 20, a flue gas desulfurization unit ("FGD") 22, a secondary air source 24, an exhaust stack 26, one or more conduits 28-42 which may have one or more check valves 44, 46, and/or a controller 48.

The first boiler 12 includes a combustion chamber 50 which generates heat, e.g., thermal energy, by combusting a first fuel 52. The first boiler 12 may further include a fuel inlet 54, and an exhaust outlet 56. The fuel inlet 54 allows the first fuel 52 to flow, via conduit 40, to the combustion chamber 50. The exhaust outlet 56 vents a first flue gas produced from combusting the first fuel 52 in the combustion chamber 50. The combustion chamber 50 may be in heating-contact with conduit 28 (hereinafter referred to as steam conduit 28) which contains a working medium, e.g., water and/or another appropriate medium capable of storing thermal energy. In embodiments, the exhaust port 56 may be fluidly connected to the exhaust stack 26, via conduit 34 (hereinafter referred to as exhaust conduit 34), such that the vented first flue gas flows from the combustion chamber 50 to the exhaust stack 26. As shown in FIG. 1, the APH 18, ESP/FF 20, and FGD 22 may be disposed in/along the exhaust conduit 34 such that APH 18, ESP/FF 20, and FGD 22 treat and/or clean the first flue gas prior to being expelled into the atmosphere by the exhaust stack 26. In embodiments, the first fuel 52 may be an oil to include Oil Heavy Residue ("OHR") and/or Heavy Fuel Oil ("HFO"). As will be appreciated, in embodiments, OHR may be a blend of low grade petroleum fuels and/or solid fuels, e.g., coal and/or petroleum coke, which may contain a high amount of metals, e.g., V, Ni, Na, etc., and/or sulfur. For example, in some embodiments, the metal content of the first fuel 52 may be 0 to 1000 ppm and the sulfur content may be between 0 and 15% by weight.

The second boiler 14 includes a combustion chamber 58 which generates heat, e.g., thermal energy, by combusting a second fuel 60. The second boiler 14 may further include a fuel inlet 62 and an exhaust outlet 64. The fuel inlet 62 allows the second fuel 60 to flow, via conduit 42, to the combustion chamber 58. The exhaust outlet 64 vents a second flue gas produced from combusting the second fuel 60 in the combustion chamber 58. In embodiments, the exhaust outlet 64 of the second boiler 14 may be fluidly connected, via conduit 32 (hereinafter referred to as flue gas conduit 32), such that the vented second flue gas flows from the combustion chamber 58 of the second boiler 14 to the first boiler 12. For example, in such embodiments, the flue gas generated by the second boiler 14 may be in heating-contact with an economizer 33, a feed water heating line, and/or an air pre-heater, e.g., APH 18, of the first boiler 12. In embodiments, the flue gas conduit 32 may be fluidly connected to the first boiler 12 at a convective bypass 70 of the first boiler 12.

As shown in FIG. 1, the combustion chamber 58 may also be in heating-contact with the steam conduit 28. The steam conduit 28 includes an inlet 66 and an outlet 68 configured to fluidly connect to the first boiler 12 and to the steam turbine generator 16, respectively. As is to be appreciated, in embodiments, the steam conduit 28 may be a single conduit or may include segments fluidly connected to one another. For example, in embodiments, conduit 30, (hereinafter referred to as supercritical steam conduit 30), may form part of the steam conduit 28 that connects the second boiler 14 to the steam turbine generator 16. In embodiments, the supercritical steam conduit 30 may be configured, e.g., the walls of the supercritical steam conduit 30 may be relatively thick, to contain supercritical steam. As is to be appreciated, in embodiments, the steam conduit 28 may form part of the second boiler 14 and/or otherwise be disposed in the second boiler 14.

In embodiments, the first 12 and/or the second 14 boilers may be fluidly connected, via conduit 36 (hereinafter referred to as the secondary air conduit 36), to the secondary air source 24 which may supply hot air to the combustion chambers 50 and 58 to improve the efficiency of the first 12 and/or the second 14 boilers, respectively, e.g., the secondary air source 24 may be common between the first 12 and the second 14 boilers. In other embodiments, however, the first 12 and the second 14 boilers may utilize independent secondary air sources. As shown in FIG. 1, the APH 18 may be disposed in the secondary air conduit 36.

The controller 48 may include at least one processor/CPU 72 and a memory device 74 that stores a heating program/application. The controller 48 may be disposed in the system 10 such that the controller 48 is in electronic communication with the various components, to include the first 12 and the second boilers 14.

Figure 2:
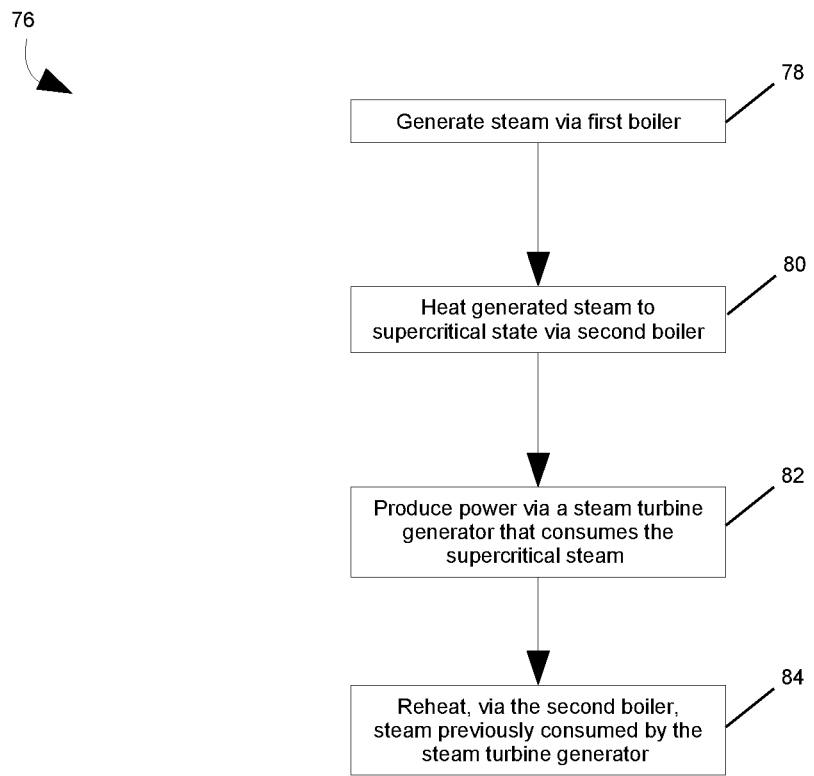
FIG. 2 is a flow chart depicting a method for providing supercritical steam via the system of FIG. 1 in accordance with an embodiment of the invention.

Turning now to FIG. 2, a method 76 for providing supercritical steam via the system 10 is shown. As is to be appreciated, in embodiments, a heating application stored in the memory device 74 may be loaded into the at least one processor/CPU 72 such that the controller 48 is adapted by the heating application to perform all, or part, of method 76. Thus, in embodiments in accordance with the method 76, the first boiler 12 generates 78 steam via combusting the first fuel 52 such that a first temperature of the conduit 28 that contains the steam is below a critical corrosion temperature at which contaminants produced by combusting the first fuel 52 corrode the conduit 28. In embodiments, the first temperature of the conduit 28 may be the temperature of the sections of the conduit 28 that are exposed to the contaminants produced via combusting the first fuel 52. For example, in embodiments, the contaminants produced by combusting the first fuel 52 may have a critical corrosion temperature of 600° C. Accordingly, the first boiler 12 may be configured to limit the first temperature of the conduit 28 to a temperature lower than 600° C. by limiting the temperature of the steam contained in the sections of the conduit 28 that are exposed to the contaminants produced via combusting the first fuel 52 to 540° C. While the embodiments disclosed herein limit the first temperature of the conduit 28 by limiting the temperature of the steam contained within the sections the conduit 28 that are exposed to the contaminants produced via combusting the first fuel 52, it is to be understood that other embodiments may limit the first temperature of the conduit 28 by limiting the firing temperature of the first fuel 52.

The generated steam then flows, via the steam conduit 28, to the second boiler 14 where the steam is heated 80 to a supercritical steam temperature via combusting the second fuel 60 in the combustion chamber 58 such that a second temperature of the conduit 28 is greater than or equal to the critical corrosion temperature of the first fuel 52. The second temperature of the conduit 28 may be the temperature of the sections of the conduit 28 that are not exposed to the contaminants produced via combusting the first fuel 52. In embodiments, the second temperature of the conduit 28 may be between about 565° C.-700° C. In embodiments, the second temperature of the conduit 28 may be between 630° C.-670° C. which allows the contained steam to reach a supercritical steam temperature at and/or between 600° C.-620° C. In embodiments, the supercritical steam may have a temperature between 594° C.-625° C. In other embodiments, the supercritical steam may have a temperature higher than 625° C. and/or lower than 594° C. For example, in some embodiments, the supercritical steam may have a temperature on the order of 565° C. or greater than or equal to 700° C. It is to be understood, however, that the aforementioned ranges are merely exemplary and are not intended to be limiting.

Thus, as is to be appreciated, in embodiments, the first boiler 12 provides the majority of the steam duty by heating the working medium to a superheated state, and the second boiler 14 provides the remaining steam duty by heating the superheated working medium to a supercritical steam temperature.

It is to be understood that, in embodiments, the second fuel 60 is of a higher grade and/or "cleaner" than the first fuel 52. The terms "clean" and "dirty," as used herein with respect to fuels, refer to the level of $CO_2$ and/or corrosive contaminants produced via combusting the fuels, wherein combustion of an amount of a clean fuel produces less $CO_2$ and/or less corrosive contaminants that does combustion of an equal amount of a dirty fuel. For example, in embodiments, the second fuel 60 may be a gas, a blend of various liquid fuels, e.g., diesel, kerosene, and/or crude oil, and may additionally include blended solid fuels, e.g., coal, lignite, and/or biomass. In some embodiments, the second fuel 60 may have a low metal, e.g., below 10 ppm, and/or sulfur content. As such, combustion of the second fuel 60 may produce fewer contaminants than combustion of the first fuel 52. Thus, the second temperature of the conduit 28 may be higher than the first temperature of the conduit 28 without an increase in the risk of corrosion to the conduit 28.

The supercritical steam then flows, via the supercritical steam conduit 30, to the steam turbine generator 16 which consumes the supercritical steam to produce 82 power. For example, in embodiments, the steam turbine generator 16 may produce electrical power as part of an oil-based electrical power generation plant/system.

Continuing, in embodiments, the second boiler 14 may further include a reheat inlet 83 that is fluidly connected to the steam turbine generator 16, via conduit 38 (hereinafter referred to as reheat-conduit 38), such that the second boiler 14 forms part of a reheat-cycle-circuit for the steam turbine generator 16, e.g., the second boiler 14 provides the reheat duty. In such embodiments, the second boiler 14 may reheat 84 steam previously consumed by the steam turbine generator 16 and return, via the supercritical steam conduit 30, the reheated steam back to the steam turbine generator 16. While the embodiments shown in the provided figures depict the second boiler 14 returning the reheated steam back to the steam turbine generator 16 via the supercritical steam conduit 30, it is to be appreciated that in other embodiments the second boiler 14 may return the reheated steam back to the steam turbine generator 16 via other conduits/flow paths which may exists between the second boiler 14 and the steam turbine generator 16. For example, in embodiments, conduit 38 may extend through the second boiler 14 to the steam turbine generator 16.

Figure 3:
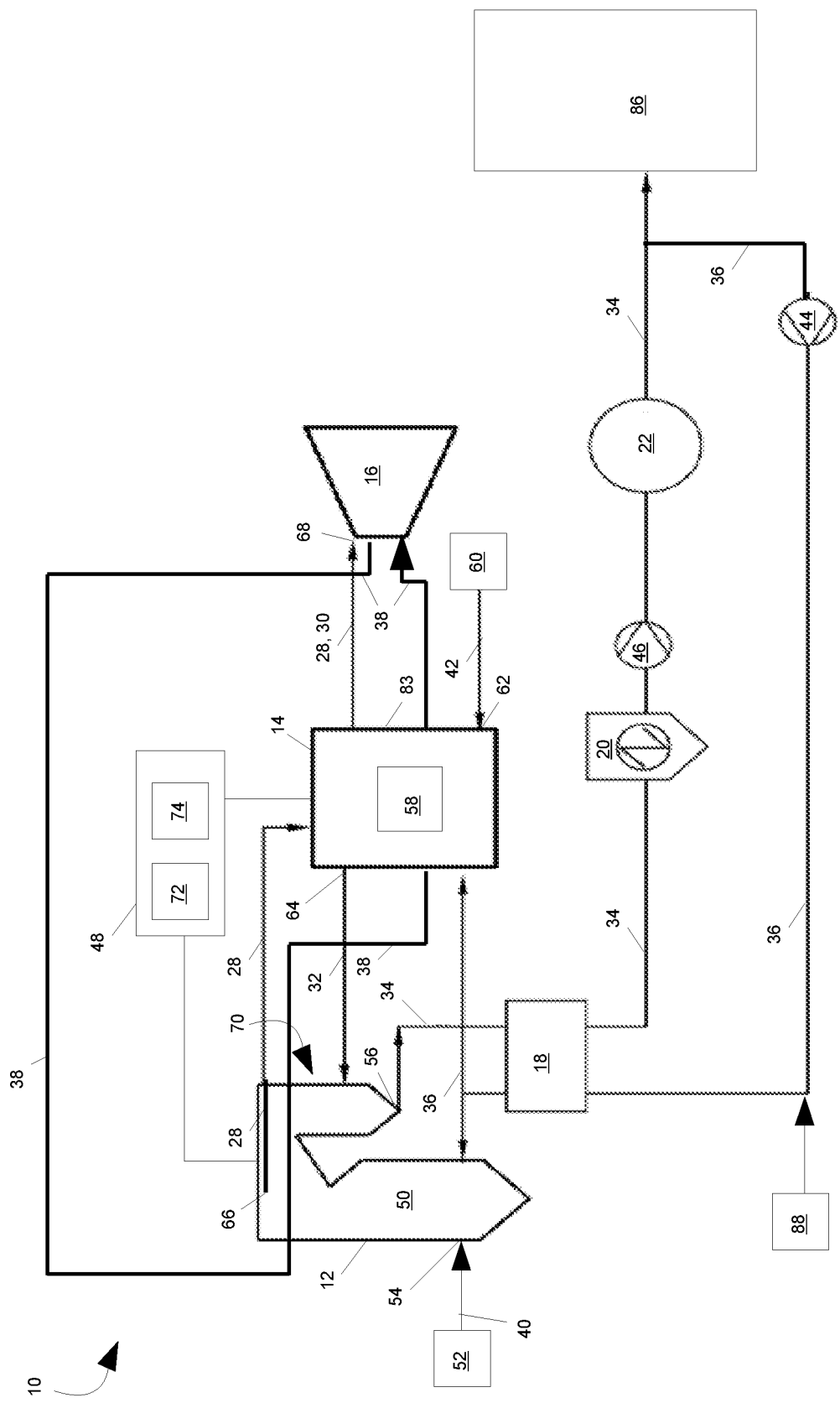
FIG. 3 is an additional diagram of the system of FIG. 1, wherein the system includes an oxy-fired boiler.

Additionally, while FIG. 1 shows an embodiment of the system 10 in which the first boiler 12 is an air-fired boiler, it is to be understood that in other embodiments the first boiler 12 may be an oxy-fired boiler. Accordingly, as shown in FIG. 3, in such embodiments, the system 10 may further include a gas processing unit ("GPU") 86 and an oxygen source 88. The GPU 86 may be disposed in the exhaust conduit 34 and the secondary air conduit 36 as illustrated in FIG. 3. In such embodiments, oxygen may flow, via the secondary air conduit 36, from the oxygen source 88 to the combustion chambers 50 and 58 of the first 12 and the second 14 boilers, respectively, e.g., the oxygen source 88 may be common between the first 12 and the second 14 boilers. Similarly, in embodiments, the second boiler 14 may be an air fired or an oxy-fired boiler. Further, in embodiments, the first 12 and the second 14 boilers may be connected to independent oxygen sources.

Figure 4:
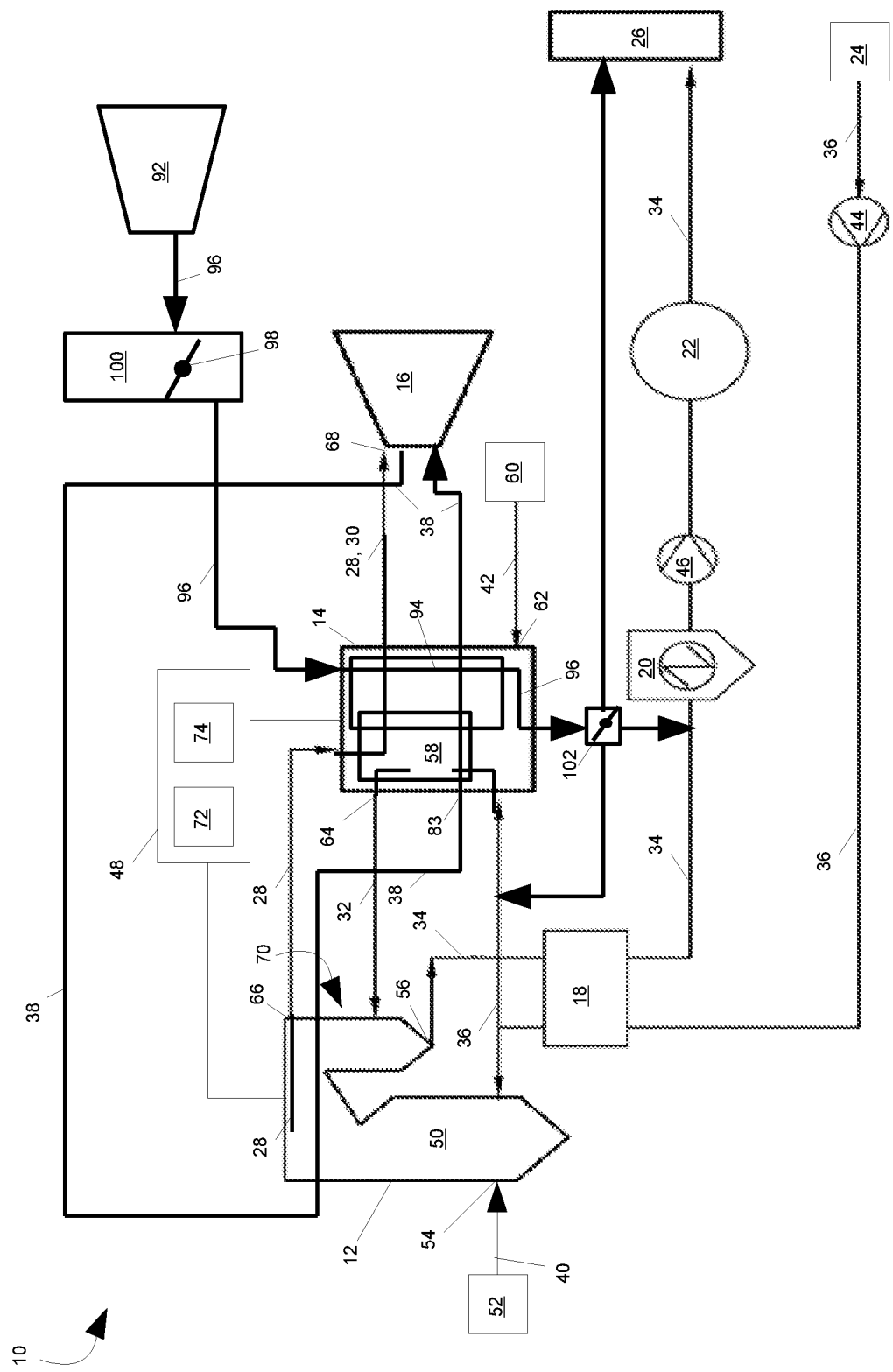
FIG. 4 is an additional diagram of the system of FIG. 1, wherein the system includes a gas turbine in accordance with an embodiment of the invention.

Moving now to FIG. 4, in embodiments, the system 10, may include a gas turbine 92 fluidly connected to a heat exchanger 94 via conduit 96 which, as shown, may be incorporated into the second/secondary boiler 14. In such embodiments, the gas turbine 92 generates power, e.g., electrical power, by combusting a fuel, which in embodiments may be the second fuel 60, to produce a flue gas that flows from the gas turbine 92 to the heat exchanger 94 via conduit 96. The heat exchanger 94 is also fluidly connected to the first/primary boiler 12, via conduit 28, such that the generated steam flows from the primary boiler 12 to the heat exchanger 94 which heats the generated steam via the flue gas from the gas turbine 92. In embodiments, the heat exchanger 94 may heat the generated steam to a supercritical steam temperature prior to being sent for consumption by the steam turbine generator 16. In embodiments, a combined carbon emission rate of the primary boiler 12 and the gas turbine 92 may be less than a combined carbon emission rate of generating and heating the steam to a supercritical steam temperature using boilers that only combust/burn the first fuel 52. As also shown in FIG. 4, in embodiments, the flue gas from the gas turbine 92 may also be used to heat the steam in reheat-conduit 38.

As further shown in FIG. 4, in embodiments, a first damper/valve 98 may be disposed upstream of the heat exchanger 94 within conduit 96 which allows the flue gas from the gas turbine 92 to be diverted away from the heat exchanger 94 for emission into the atmosphere via an exhaust stack 100. Additionally, in embodiments, conduit 96 may be fluidly connected to a second damper/valve 102 disposed downstream of the heat exchanger 94 that allows the flue gas produced by the gas turbine 92 to be directed to: the stack 26 for emission into the atmosphere; a point just upstream of the ESP/FF 20; and/or conduit 36 such that the flue gas enters combustion chambers 50 and/or 58 to improve the efficiency of the first/primary 12 and/or the second/secondary 14 boilers.

As will be appreciated, in embodiments, the gas turbine 92 may have a faster startup procedure time, i.e., the amount of time that it takes from starting the gas turbine 92 until power, e.g., electrical power, can be generated, than the startup procedure time for the primary 12 and/or the secondary 14 boilers, i.e., the amount of time it takes from starting the primary 12 and/or the secondary 14 boilers until power, e.g., electrical power can be generated. In such embodiments, the gas turbine 92 may provide for an encompassing power plant to generate power faster than some traditional power plants that rely on boilers for the generation of steam. In particular, by diverting the flue gas out the exhaust stack 100, the first damper 98 provides for the gas turbine 92 to be utilized for power generation prior to the start of combustion in the first 12 and/or second 14 boilers.

Figure 5:
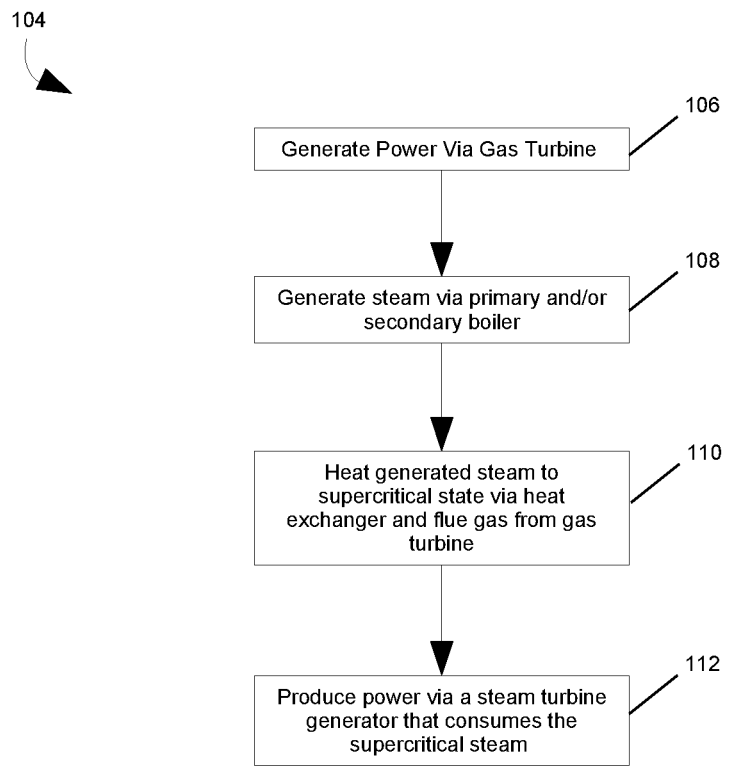
FIG. 5 is a flow chart depicting a method for providing supercritical steam via the system of FIG. 4 in accordance with an embodiment of the invention.

For example, shown in FIG. 5 is another method 104 for providing supercritical steam via the system 10. In embodiments, the heating application stored in the memory device 74 may be loaded into the at least one processor/CPU 72 such that the controller 48 is adapted by the heating application to perform all, or part, of method 104. As shown in FIG. 5, in embodiments, the gas turbine 92 may be used to generate 106 power prior to generating 108 steam via the primary 12 and/or the secondary 14 boilers, wherein the damper 98 diverts the flue gas within conduit 96 out the exhaust stack 100. Once the primary 12 and/or the secondary 14 boilers are generating 108 steam, or just prior to generating 108 steam, the damper 98 may be adjusted such that the flue gas is allowed to flow through conduit 96 to the heat exchanger 94 such that the heat exchanger 94 heats 110 the generated steam to a supercritical temperature which is then consumed by the steam turbine 16 to produce 112 power, e.g., electrical power.

Further, in embodiments, the gas turbine 92 may be used to generate power while the primary 12 and/or the secondary 14 boilers are still being constructed and/or while the primary 12 and/or the secondary 14 boilers are shut down for maintenance. Similarly, in embodiments, the primary 12 and the secondary 14 boilers may continue to generate power via steam turbine 16 while the gas turbine 92 is shutdown.

As will be further appreciated, while embodiments herein depict the system 10 as including both the gas turbine 92 and the secondary boiler 14, it will be understood that other embodiments may include the gas turbine 92 without the secondary boiler 14, i.e., the gas turbine 92 in some embodiments may stand in place of the secondary boiler 14.

Returning back to FIG. 1, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 10 may include at least one processor 72, and system memory 74, which may include random access memory (RAM) and read-only memory (ROM). The system 10 may further include an input/output controller, and one or more data storage structures. All of these latter elements may be in communication with the at least one processor 72 to facilitate the operation of the system 10 as discussed above. Suitable computer program code may be provided for executing numerous functions, including those discussed above in connection with the system 10 and methods 76 and 104 disclosed herein. The computer program code may also include program elements such as an operating system, a database management system and "device drivers" that allow the system 10, to interface with computer peripheral devices, e.g., sensors, a video display, a keyboard, a computer mouse, etc.

The at least one processor 72 of the system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 and/or one or more programs, e.g., computer program code such as the heating application and/or other computer program product, adapted to direct the system 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 72 of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for providing supercritical steam is provided. The system includes a first boiler and a second boiler. The first boiler generates steam via combusting a first fuel. The second boiler is fluidly connected to the first boiler via a conduit such that the generated steam flows from the first boiler to the second boiler which heats the generated steam to a supercritical steam temperature via combusting a second fuel that is different from the first fuel. A first temperature of the conduit is below a critical corrosion temperature at which contaminants produced by combusting the first fuel corrode the conduit and a second temperature of the conduit is greater than or equal to the critical corrosion temperature. In certain embodiments, the first fuel is at least one of a heavy oil residue, a heavy fuel oil, and a solid fuel. In certain embodiments, at least one of the first boiler and the second boiler is an air-fired boiler or an oxy-fired boiler. In certain embodiments, the second fuel is a gas or a combination of a gas blended with at least one of a liquid fuel or a solid fuel. In certain embodiments, the first boiler and the second boiler are each further fluidly connected to a common air source. In certain embodiments, combustion of the second fuel by the second boiler produces a flue gas, and the second boiler is further fluidly connected to the first boiler such that the flue gas flows from the second boiler to the first boiler. In certain embodiments, the system further includes a steam turbine generator fluidly connected to the second boiler such that the supercritical steam flows from the second boiler to the steam turbine generator which consumes the supercritical steam to produce power. In certain embodiments, the second boiler forms part of a reheat-cycle-circuit for the steam turbine generator.

Other embodiments provide for a method for providing supercritical steam. The method includes: generating steam via combusting a first fuel in a first boiler fluidly connected to a second boiler via a conduit such that the generated steam flows from the first boiler to the second boiler; and heating the generated steam to a supercritical steam temperature via combusting a second fuel that is different from the first fuel in the second boiler. In such embodiments, a first temperature of the conduit is below a critical corrosion temperature at which contaminants produced by combusting the first fuel corrode the conduit and a second temperature of the conduit is greater than or equal to the critical corrosion temperature. In certain embodiments, the first fuel is at least one of a heavy oil residue, a heavy fuel oil, and a solid fuel. In certain embodiments, at least one of the first boiler and the second boiler is an air-fired boiler or an oxy-fired boiler. In certain embodiments, the second fuel is a gas or a combination of a gas blended with at least one of a liquid fuel or a solid fuel. In certain embodiments, the method further includes producing power via a steam turbine generator that consumes the supercritical steam, the steam turbine generator fluidly connected to the second boiler such that the supercritical steam flows to the steam turbine generator from the second boiler. In certain embodiments, the method further includes reheating, via the second boiler, steam previously consumed by the steam turbine generator.

Yet still other embodiments provide for a downstream boiler for providing supercritical steam. The downstream boiler includes a combustion chamber and a steam conduit. The combustion chamber is configured to generate heat by combusting a first fuel. The steam conduit is in heating-contact with the combustion chamber and has an inlet and an outlet. The inlet is configured to fluidly connect to an upstream boiler that generates steam by combusting a second fuel that is different from the first fuel. The outlet is configured to fluidly connect to a steam turbine generator. When the inlet receives steam generated by the upstream boiler, the combustion chamber heats the received steam in the conduit to a supercritical steam temperature via combusting the first fuel such that a temperature of the steam conduit is greater than or equal to a critical corrosion temperature at which contaminants produced by combusting the second fuel corrode the steam conduit. In certain embodiments, the first fuel is a gas or a combination of a gas blended with at least one of a liquid fuel or a solid fuel; and the second fuel is at least one of a heavy oil residue, a heavy fuel oil, and a solid fuel. In certain embodiments, the combustion chamber is configured to be fluidly connected to a common air source that is also fluidly connected to the upstream boiler. In certain embodiments, the downstream boiler further includes a flue gas conduit that fluidly connects the combustion chamber to the upstream boiler such that a flue gas produced via combustion of the first fuel is brought into heating-contact with an economizer of the upstream boiler or a feed water line of the upstream boiler. In certain embodiments, the downstream boiler further includes a reheat steam inlet that is configured to receive steam from the steam turbine generator as part of a reheat-cycle for the steam turbine generator.

Yet still other embodiments provide for a system for providing supercritical steam. The system includes a first boiler and a second boiler. The first boiler generates steam via combusting a first fuel. The second boiler is fluidly connected to the first boiler via a conduit such that the generated steam flows from the first boiler to the second boiler which heats the generated steam to a supercritical steam temperature via combusting a second fuel that is different from the first fuel. In such embodiments, a combined carbon emission rate of the first boiler and the second boiler is less than a combined carbon emission rate of generating and heating the steam to a supercritical steam temperature using one or more boilers that only combust the first fuel. In certain embodiments, the first fuel is at least one of a heavy oil residue, a heavy fuel oil, and a solid fuel. In certain embodiments, at least one of the first boiler and the second boiler is an air-fired boiler or an oxy-fired boiler. In certain embodiments, the second fuel is a gas or a combination of a gas blended with at least one of a liquid fuel or a solid fuel. In certain embodiments, the first boiler and the second boiler are each further fluidly connected to a common air source. In certain embodiments, combustion of the second fuel by the second boiler produces a flue gas, and the second boiler is further fluidly connected to the first boiler such that the flue gas flows from the second boiler to the first boiler. In certain embodiments, the system further includes a steam turbine generator fluidly connected to the second boiler such that the supercritical steam flows from the second boiler to the steam turbine generator which consumes the supercritical steam to produce power.

Yet still other embodiments provide for a method for providing supercritical steam. The method includes: generating steam via combusting a first fuel in a first boiler fluidly connected to a second boiler via a conduit such that the generated steam flows from the first boiler to the second boiler; and heating the generated steam to a supercritical steam temperature via combusting a second fuel that is different from the first fuel in the second boiler. In such embodiments, a combined carbon emission rate of the first boiler and the second boiler is less than a combined carbon emission rate of generating and heating the steam to a supercritical steam temperature using one or more boilers that only combust the first fuel. In certain embodiments, the method further includes producing power via a steam turbine generator that consumes the supercritical steam, the steam turbine generator fluidly connected to the second boiler such that the supercritical steam flows to the steam turbine generator from the second boiler. In certain embodiments, the method further includes reheating, via the second boiler, steam previously consumed by the steam turbine generator.

Yet still other embodiments provide a downstream boiler. The downstream boiler includes a combustion chamber and a steam conduit. The combustion chamber is configured to combust a first fuel. The steam conduit is in heating-contact with the combustion chamber and has an inlet and an outlet. The inlet is configured to fluidly connect to an upstream boiler that generates steam by combusting a second fuel that is different from the first fuel. The outlet is configured to fluidly connect to a steam turbine generator. In such embodiments, a combined carbon emission rate of the downstream boiler and the upstream boiler is less than a combined carbon emission rate of one or more boilers that only combust the second fuel.

Yet still other embodiments provide for a system for providing supercritical steam. The system includes a primary boiler that generates steam via combusting a first fuel; a gas turbine that produces a flue gas via combusting a second fuel that is different from the first fuel; and a heat exchanger fluidly connected to the primary boiler and to the gas turbine via a first conduit and a second conduit, respectively. The generated steam and the flue gas flow from the primary boiler and the gas turbine via the first conduit and the second conduit, respectively, to the heat exchanger which heats the generated steam via the flue gas to a supercritical steam temperature. In certain embodiments, a first temperature of the first conduit is below a critical corrosion temperature at which contaminants produced by combusting the first fuel corrode the first conduit and a second temperature of the first conduit is greater than or equal to the critical corrosion temperature. In certain embodiments, a combined carbon emissions rate of the primary boiler and the gas turbine is less than a combined carbon emission rate of generating and heating the steam to a supercritical steam temperature using one or more boilers that only combust the first fuel. In certain embodiments, the first fuel is at least one of a heavy oil residue, a heavy fuel oil, and a solid fuel. In certain embodiments, the heat exchanger is incorporated into a secondary boiler that heats the generated steam. In certain embodiments, the secondary boiler heats the generated steam by combusting the second fuel. In certain embodiments, the second fuel is a gas or a combination of a gas blended with at least one of a liquid fuel or a solid fuel.

Yet still other embodiments provide for a method for providing supercritical steam. The method includes: generating steam via combusting a first fuel in a primary boiler fluidly connected to a heat exchanger via a first conduit such that the generated steam flows to the heat exchanger from the primary boiler via the first conduit; and heating the generated steam to a supercritical steam temperature via a flue gas produced by combusting a second fuel in a gas turbine fluidly connected to the heat exchanger via a second conduit such that the flue gas flows to the heat exchanger via the second conduit, the second fuel being different from the first fuel. In certain embodiments, a first temperature of the first conduit is below a critical corrosion temperature at which contaminants produced by combusting the first fuel corrode the first conduit and a second temperature of the first conduit is greater than or equal to the critical corrosion temperature. In certain embodiments, a combined carbon emission rate of the primary boiler and the gas turbine is less than a combined carbon emission rate of generating and heating the steam to a supercritical steam temperature using one or more boilers that only combust the first fuel. In certain embodiments, the first fuel is at least one of a heavy oil residue, a heavy fuel oil, and a solid fuel. In certain embodiments, the heat exchanger is incorporated into a secondary boiler that heats the generated steam. In certain embodiments, the secondary boiler heats the generated steam by combusting the second fuel. In certain embodiments, the method may further include directing the flue gas into at least one of the primary boiler or the secondary boiler after the heat exchanger has heated the generated steam via the flue gas. In certain embodiments, the method may further include generating power via the gas turbine prior to generating steam via combusting the first fuel in the primary boiler.

Accordingly, as is to be appreciated, by using the second boiler 14 to heat the steam generated by the first boiler 12 to a critical corrosion temperature, the system 10 can produce supercritical steam without the first temperature of the sections of conduit 28, that come into contact with the contaminants produced via combusting the first fuel 52, exceeding the critical corrosion temperature of the contaminants produced by combusting the first fuel 52. Thus, some embodiments of the system 10 improve the efficiency of oil-based power plants without increasing the risk of corrosion.

Additionally, some embodiments, where the first fuel 52 is a low-grade oil such as OHR, allow oil-based power plants to operate under supercritical steam conditions while taking advantage of abundant low-grade fuels.

Further, in some embodiments, the second boiler 14 may be smaller than the first boiler 12. Thus, in such embodiments, the second boiler 14 may be disposed within the system 10 close to the steam turbine generator 16, thus decreasing the length and cost of the supercritical steam conduit 30. For example, in such embodiments, the length of the supercritical steam conduit 30 may be on the order of one third of what it would be with the conventional boiler arrangement without such a second boiler.

Further still, by combusting a second fuel 60 that produces lower amounts of $CO_2$ than a first fuel 52, some embodiments of the present invention reduce the amount of $CO_2$ emitted by a power plant. In other words, some embodiments of the present invention offload some of the steam heating duty from a first boiler 12 to a second boiler 14, wherein the second boiler 14 burns a second fuel 60 that emits less $CO_2$ than a first fuel 52 burned by the first boiler 12. Thus, as will be appreciated, in some embodiments of the present invention, the combined carbon emissions of the first boiler 12 and the second boiler 14 required to generate supercritical steam is lower than the combined carbon emissions of using one or more boilers that only burn the first fuel 52, e.g., a high $CO_2$ emitting fuel, to generate the same amount of super supercritical steam.

Yet further still, by utilizing gas as the second fuel 60, some embodiments of the present invention provide for higher flue gas velocities, tighter spacing of conduits, and/or a reduced need for sootblowers.

Moreover, by utilizing a gas turbine generator to heat the generated steam, some embodiments provide for an encompassing power plant to generate electrical power via the gas turbine prior to the completion of the primary and/or the secondary boilers.

Additionally, it will be understood embodiments of the present invention may be implemented both during construction of a new power plant and/or via retrofitting of an existing power plant which may, prior to being retrofitted, generate steam at sub-critical temperatures, e.g., less than 565° C. Thus, some embodiments of the present invention may extend the service lives of existing power plants, and in particular, the service lives of existing power plants that primarily burn coal.

As is to be appreciated, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for providing supercritical steam, comprising:
   a first boiler that generates steam via combusting a first fuel;
   a second boiler fluidly connected to the first boiler, wherein the second boiler is operative to heat the generated steam from the first boiler via combustion of a second fuel that is different from the first fuel, wherein the combustion of the second fuel by the second boiler produces a flue gas, wherein the flue gas flows from the second boiler to the first boiler;
   a heat exchanger disposed in the second boiler to heat the steam to a supercritical steam temperature, wherein the heat exchanger is fluidly connected to the first boiler via a conduit such that the generated steam flows from the first boiler to the second boiler and the heat exchanger;
   a steam turbine generator fluidly connected to the second boiler and the heat exchanger, wherein the supercritical steam flows from the heat exchanger to the steam turbine generator, wherein the steam turbine generator consumes the supercritical steam to produce power; and
   a reheat conduit fluidly connected to the first boiler, the second boiler, the heat exchanger and the steam turbine generator, wherein the reheat conduit returns steam consumed by the steam generator to the first boiler, the second boiler, and the heat exchanger for reheating the consumed steam for reuse by the steam turbine generator, wherein the reheat conduit provides the reheated steam from the second boiler and the heat exchanger to the steam turbine generator, wherein the steam turbine generator receives the reheated steam along with the supercritical steam provided from the heat exchanger.

2. The system of claim 1, wherein the first fuel is at least one of a heavy oil residue, a heavy fuel oil, and a solid fuel.

3. The system of claim 1, wherein the second fuel is a gas or a combination of a gas blended with at least one of a liquid fuel or a solid fuel.

4. The system of claim 1, wherein the first boiler and the second boiler are each fluidly connected to a common air source.

5. The system of claim 1, wherein the second boiler forms part of a reheat-cycle-circuit for the steam turbine generator.

6. The system of claim 1, further comprising:
   a gas turbine that produces a turbine flue gas via combusting a third fuel that is different from the first fuel, wherein the heat exchanger is fluidly connected to the gas turbine to heat the generated steam via the turbine flue gas.

7. A method for providing supercritical steam, the method comprising:
   generating steam via combusting a first fuel in a first boiler;
   heating the generated steam from the first boiler in a second boiler fluidly connected to the first boiler via combustion of a second fuel that is different from the first fuel, wherein the combustion of the second fuel by the second boiler produces a flue gas, wherein the flue gas flows from the second boiler to the first boiler;
   disposing a heat exchanger in the second boiler to heat the steam to a supercritical steam temperature, and fluidly connecting the heat exchanger to the first boiler via a conduit, wherein the generated steam flows from the first boiler to the second boiler and the heat exchanger;

directing the supercritical steam from the heat exchanger to a steam turbine generator fluidly connected to the second boiler, wherein the steam turbine generator consumes the supercritical steam to produce power;

fluidly connecting a reheat conduit to the first boiler, the second boiler, the heat exchanger and the steam turbine generator, wherein the reheat conduit returns steam consumed by the steam generator to the first boiler, the second boiler and the heat exchanger for reheating the consumed steam for reuse by the steam turbine generator, wherein the reheat conduit provides the reheated steam from the second boiler and the heat exchanger to the steam turbine generator, wherein the steam turbine generator receives the reheated steam along with the supercritical steam provided from the heat exchanger.

8. The method of claim 7, wherein the first fuel is at least one of a heavy oil residue, a heavy fuel oil, and a solid fuel.

9. The method of claim 7, wherein at least one of the first boiler and the second boiler is an air-fired boiler or an oxy-fired boiler.

10. The method of claim 7, wherein the second fuel is a gas or a combination of a gas blended with at least one of a liquid fuel or a solid fuel.

11. The method of claim 7, further comprising:
heating the generated steam via the heat exchanger with a flue gas generated by a gas turbine.

12. A downstream boiler for providing supercritical steam, the downstream boiler comprising:
a combustion chamber configured to generate heat by combusting a first fuel;
a heat exchanger disposed in the combustion chamber and fluidly connected to an upstream boiler that generates steam by combusting a second fuel that is different from the first fuel, wherein the heat exchanger heats the generated steam from the upstream boiler to a supercritical steam temperature;
a flue gas conduit that fluidly connects the combustion chamber to the upstream boiler such that a flue gas produced via combustion of the first fuel is brought into heating-contact with an economizer of the upstream boiler or a feed water line of the upstream boiler;
a steam conduit that fluidly connects the heat exchanger to a steam turbine generator, wherein the steam conduit carries the supercritical steam to the steam turbine generator for consumption and production of power;
a reheat conduit fluidly connected to the upstream boiler, the combustion chamber, the heat exchanger and the steam turbine generator, wherein the reheat conduit returns steam consumed by the steam generator to the upstream boiler, the combustion chamber, and the heat exchanger for reheating the consumed steam for reuse by the steam turbine generator, wherein the reheat conduit provides the reheated steam from the heat exchanger to the steam turbine generator, wherein the steam turbine generator receives the reheated steam along with the supercritical steam provided from the heat exchanger.

13. The downstream boiler of claim 12, wherein
the first fuel is a gas or a combination of a gas blended with at least one of a liquid fuel or a solid fuel; and
the second fuel is at least one of a heavy oil residue, a heavy fuel oil, and a solid fuel.

14. The downstream boiler of claim 12, wherein the combustion chamber is configured to be fluidly connected to a common air source that is also fluidly connected to the upstream boiler.

15. The downstream boiler of claim 12, wherein the heat exchanger is operative to heat the generated steam via a turbine flue gas from a gas turbine.

16. The system of claim 1, wherein the flue gas produced via combustion of the second fuel in the second boiler is brought into heating-contact with an economizer of the first boiler or a feed water line of the first boiler.

* * * * *